No. 817,952. PATENTED APR. 17, 1906.
J. B. BARTHOLOMEW.
STRAW STACKER.
APPLICATION FILED NOV. 7, 1899. RENEWED OCT. 29, 1904.
5 SHEETS—SHEET 3.
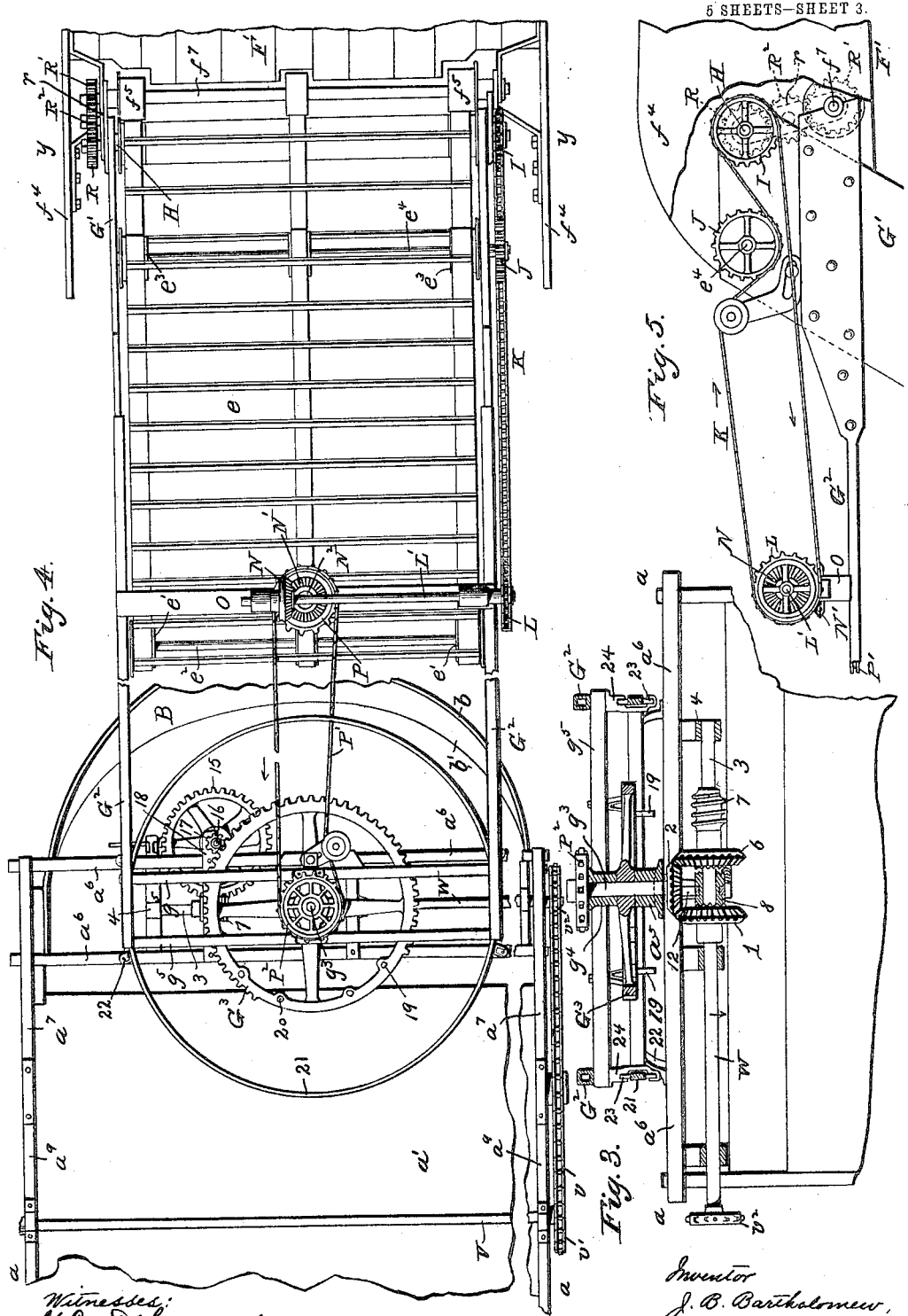

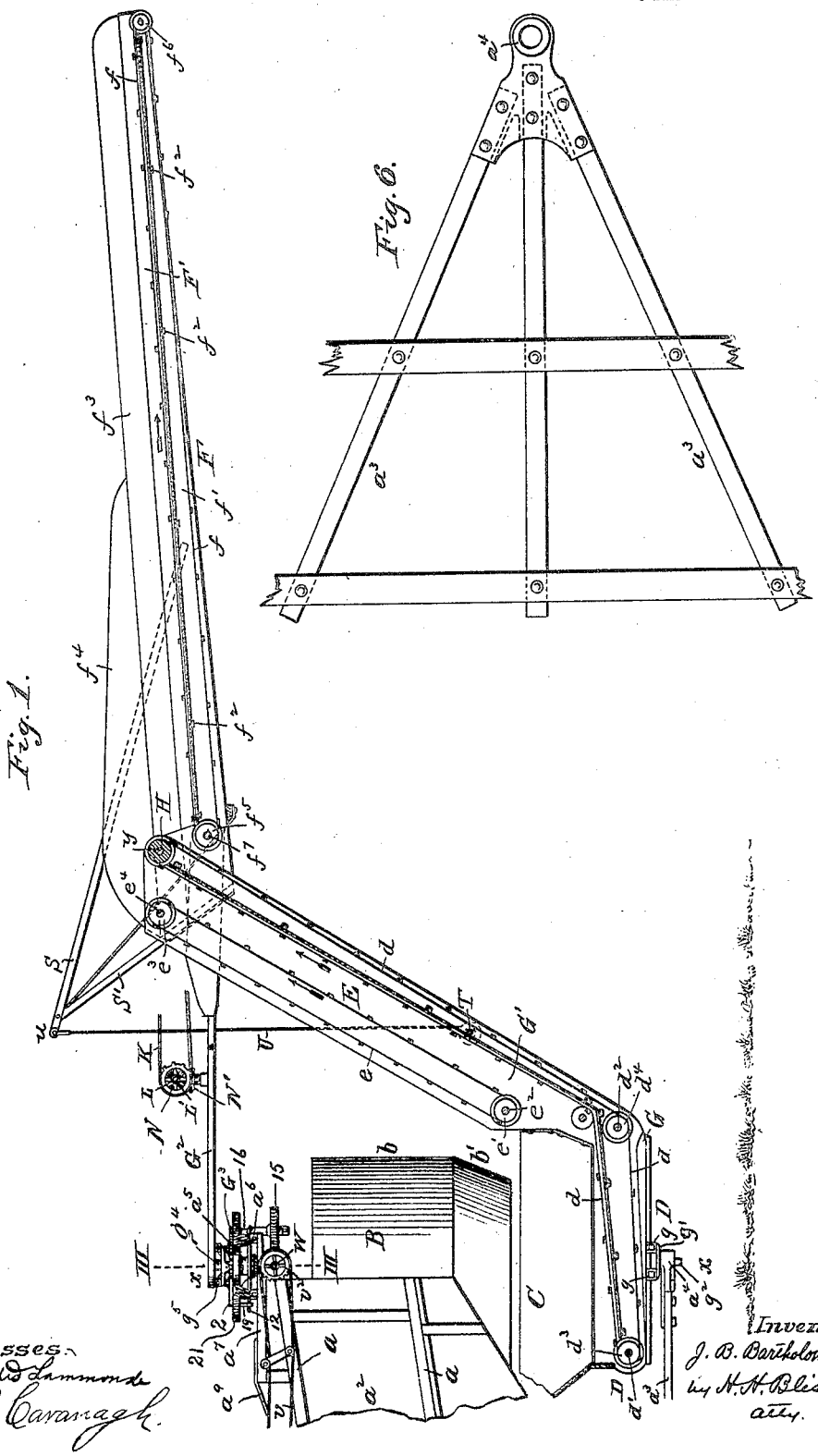

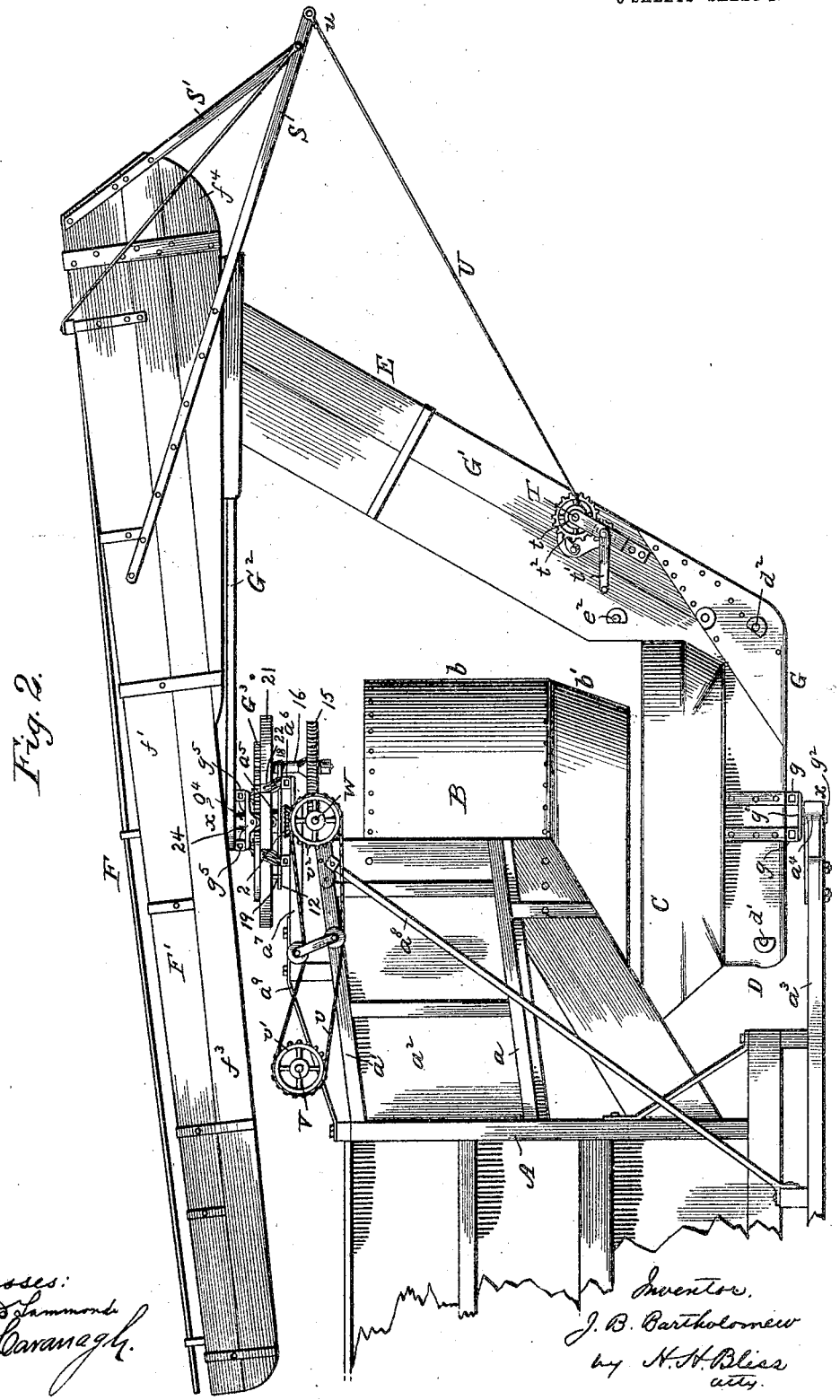

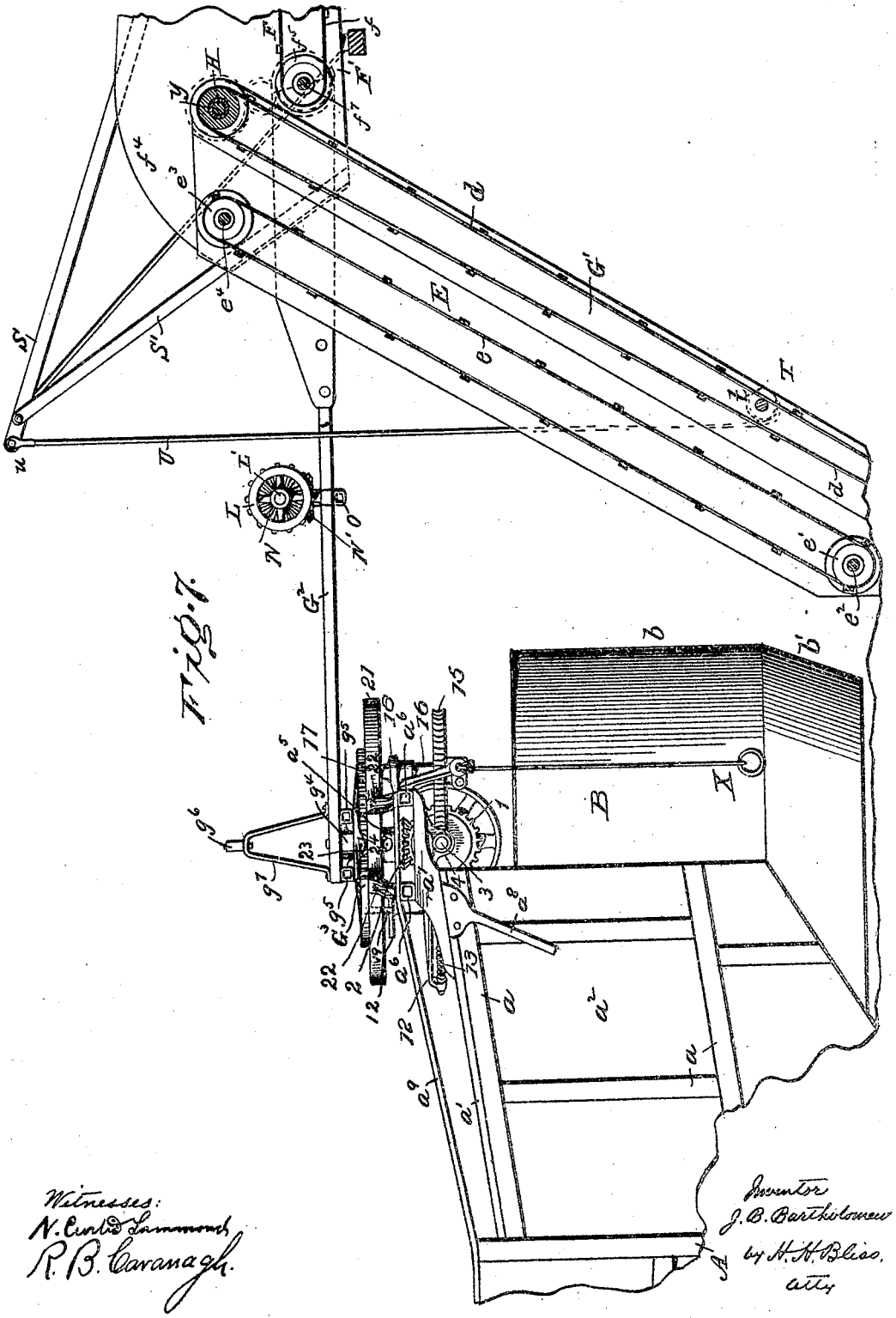

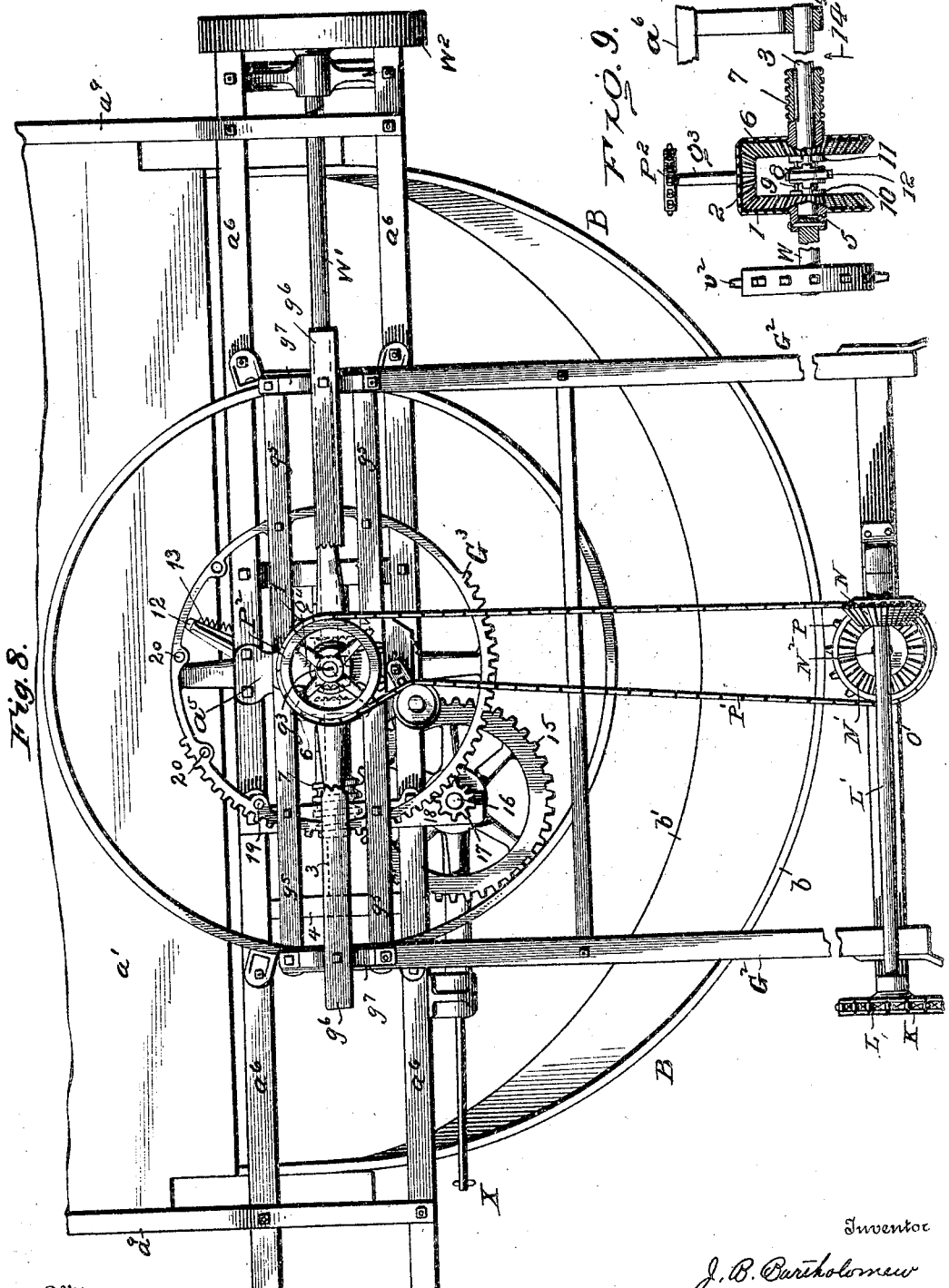

UNITED STATES PATENT OFFICE.

JOHN B. BARTHOLOMEW, OF PEORIA, ILLINOIS, ASSIGNOR, BY MESNE ASSIGNMENTS, TO THE SATTLEY STACKER COMPANY, OF INDIANAPOLIS, INDIANA, A CORPORATION OF MAINE.

STRAW-STACKER.

No. 817,952. Specification of Letters Patent. Patented April 17, 1906.

Application filed November 7, 1899. Renewed October 29, 1904. Serial No. 230,605.

*To all whom it may concern:*

Be it known that I, JOHN B. BARTHOLOMEW, a citizen of the United States, residing at Peoria, in the county of Peoria and State of Illinois, have invented certain new and useful Improvements in Straw-Stackers, of which the following is a specification, reference being had therein to the accompanying drawings.

In order to make my invention more clearly understood, I have shown in the accompanying drawings means for carrying the same into practical effect without limiting my improvements in their useful applications to the particular constructions which for the sake of illustration I have delineated.

In said drawings, Figure 1 is a side elevation of a portion of a threshing-machine having attached thereto an automatic straw-stacker embodying my invention, the same being shown partly in section, the outer portion of the straw elevator or carrier being in position for operation. Fig. 2 is a side view of the same, on a larger scale, with said carrier folded in position for transportation. Fig. 3 is a transverse vertical sectional view on line III III, Fig. 1. Fig. 4 is a plan view of a portion of the mechanism for oscillating the stacker and driving the elevators. Fig. 5 is a side view of the sprocket-gearing directly connected with the upper ends of the elevator-belts. Fig. 6 is a plan view of the rearward-extending frame detached projecting back from the separator-frame for supporting the lower inner end of the stacker-frame. Fig. 7 is a view, partly in side elevation and partly in vertical section, showing a slight modification of the gearing or power devices by which the carrier-belts are actuated and the stacker is oscillated. Fig. 8 is a plan view, on a larger scale, of some of the parts shown in Fig. 7. Fig. 9 is a sectional view, on a larger scale, showing a portion of the reversing mechanism illustrated in Fig. 3.

Referring to the drawings, A indicates a portion of the frame of the threshing-machine, attached to which and extending rearwardly and preferably upwardly is a frame $a$ of suitable construction, having a top casing $a'$ and side casing-walls $a^2$ inclosing a space into and through which the threshed straw is delivered by any usual or suitable means. The outward movement of the straw is limited by a hood or receptacle B, which is attached to the rearward extension of the machine above described. While this receptacle may be of any suitable material and construction, I prefer to make it of sheet metal having an upper semicylindrical part $b$ and a lower contracted portion $b'$, open at the bottom. Through this bottom the straw falls into a hopper or receiver C, which is carried by and moves with the lower portion of the stacker in its oscillations.

The stacker comprises three principal portions—a substantially horizontal carrier D, an inclined elevator E, and an upper carrier F—all adapted to oscillate upon a vertical axis $x$ $x$ for the distribution of the straw in the usual manner and the upper carrier being adapted to turn upon a horizontal axis $y$ to adjust the height of its outer end or to fold it for transportation, as shown in Fig. 2. The said portions of the stacker are by preference composed of three belts or endless carriers $d$ $e$ $f$. The belt $d$ is so supported and driven as to form the said horizontal carrier D and the lower or outer part of the inclined carrier E. The belt $e$ is arranged at the inner side of and parallel with the upper part of the belt $d$ and coöperates with it in elevating the straw. The belt $f$ extends outward from the upper end of the latter belt and carries the straw to the point of delivery on the stack.

The lower support for the stacker is furnished by a frame $a^3$, attached to the lower part of the frame A and carrying at its outer end a bearing $a^4$. The lower part of the stacker-frame G is supported by cross-beams $g$, resting upon a bracket $g'$, which latter is formed with a journal or pivot $g^2$, which fits in the bearing $a^4$ and is adapted to turn therein to allow the oscillation of the stacker.

$d'$ $d^2$ are transverse shafts mounted in suitable bearings on the frame G and provided with pulleys $d^3$ $d^4$, which support, respectively, the inner end and the outer lower corner of the outer leg of the belt $d$.

G' is the frame of the elevating portion of the stacker, attached at its lower end to the frame G and having its upper end connected with the upper pivot of the stacker by a frame $G^2$.

$g^3$ is a shaft or journal constituting such upper pivot and carried by a bracket $a^5$. The latter rests upon cross-beams $a^6$, carried in turn by a frame $a^7$. The latter is constructed as a part of or is carried by the frame $a$, and the whole construction forming the rearward extension of the threshing-machine frame is strongly braced by inclined struts $a^8$, extending from one of the cross-girths of the frame A to the upper outer end of the frame $a$ and by rods $a^9$, which connect the frame $a^7$ with one of the upper cross-beams of the frame A. The pivot or shaft $g^3$ fits in a sleeve $g^4$, which is attached to the frame $G^2$. In the construction illustrated said sleeve is shown as formed with a gear-wheel $G^3$ attached to cross-beams $g^5$, which latter form the inner cross connections for the side bars of the frame $G^2$.

In order to have the parts connected together and operate in the most advantageous manner and without cramping or binding, it is preferable that the journaling of the hinge devices at $g^3$ $g^4$ should be upon a vertical axis coincident with that of the parts $g^2$ $a^4$ at the bottom of the frame. When so arranged, the entire stacker-frame can swing without hindrance horizontally to the right or the left. The framework composed of the parts G G' $G^2$ is rigid throughout and has great strength, so as to properly carry the outer vertically-adjustable delivery carrier-belt $f$ and its long frame F'. This outer swinging carrier-frame has the longitudinal sill-bars $f'$, the cross-girths $f^2$, the side fenders $f^3$, and the wide fender or hopper-board $f^4$ at the inner end. In this frame are mounted the rollers $f^5$ and $f^6$, those at $f^5$ being secured to a shaft $f^7$, through which is received the power and motion that are imparted to the carrier-belt $f$. This adjustable frame is arranged to swing upon the axis at $y$, which is the axis of the shaft and rollers at the upper end of the vertical or inclined part of the carrier $d$. Said shaft is indicated by H and is mounted in the upper ends of the parts of the frame G'. The carrier or belt $e$ at its lower end is supported by rollers $e'$ on the shaft $e^2$ and at the upper end by the rollers $e^3$ on the shaft $e^4$.

The belts $d$ and $e$ are driven by the shafts H and $e^4$, they being provided, respectively, with the sprocket-wheels I and J, with which the chain K engages. This chain engages with a driving-sprocket L, which is at the end of the shaft L', which is mounted transversely across the upper and inner frame $G^2$. At the center of the frame it has a gear-wheel N, which engages with a horizontal bevel N'. The latter is secured to a vertical shaft $N^2$, which is mounted in the cross-framework at O and carries the sprocket-wheel P at its lower end. This sprocket-wheel is connected by the chain P' with the sprocket-wheel $P^2$, that is secured to the upper end of the shaft at $g^3$.

The driving-shaft $f^7$ of the adjustable carrier-belt $f$ receives power from the shaft H of the vertical or inclined carrier through the gear-wheels R R' and the intermediate idler $R^2$. The wheel R is secured to the end of the shaft H, the wheel R' is secured to the end of the shaft $f^7$, and the wheel $R^2$ is mounted on the swinging frame-bar or radius-bar $r$, which is secured to the adjustable carrier-frame F'.

When the driving mechanism at the inner end of the frame $G^2$ is in operation, the power and motion are, through the sprockets P $P^2$, chain P', bevels N N', shaft L', sprocket L, chain K, and sprockets I and J, conveyed to the two vertical or inclined belts $d$ $e$, and as the driving-chain K engages with the sprockets J and I in opposite directions the belts $d$ and $e$ are driven in such way that the adjacent parts move in the same direction, and as the sprockets are of the same diameter and also the belt-rollers the speeds of the two belts are substantially alike, and as the shaft H is, as aforesaid, geared to the shaft $f^7$ by the wheels R' $R^2$ it will (when driven, as described, by the chain K) impart motion also to the belt $f$, which motion is in the proper direction because of the idler $R^2$. The frame-bar or radius-bar $r$, which is attached to the adjustable frame F, is hinged upon the axis of the shaft H, and therefore when the frame F is adjusted—that is to say, when its outer end is lifted or lowered—the gear-wheels R R' $R^2$ are always held in their proper working relation, that power is uniformly transmitted to the belt $f$ at all times from the shaft H. Consequently the adjustable-belt frame F' can be lifted up so as to be in lines substantially parallel to that of $d$ $e$, or it can be let down to the horizontal or below it and the carriers be maintained in continuous operation. And inasmuch as the power for all of these parts is taken from the axis about which the whole stacker oscillates horizontally, the aforesaid continuous and uniform movement of the belts will be maintained in whatsoever position (to the right or to the left) the frame may be carried around said vertical axis.

In order to adjust the swinging belt-frame F' to any desired position—that is, in order to adjust its outer end to either of the operative positions—and in order to hold it in such position after adjustment and in order to even throw it forward with its free end over the thresher-frame, as during transportation, and accomplish all these ends without requiring taking hold of the frame, but, on the contrary, enable the operator to attain them while standing upon the ground, I employ the following devices: S S are bars, preferably of metal, which are secured to the frame F at its inner end, one upon each side thereof. They project to points considerably beyond said inner end, also considerably above the side bars and guard-boards of the frame F'. If necessary, they should be braced, as by supplemental bars S', at an angle to the bars S and also secured to the belt-frame. T is a shaft mounted on a horizontal line suitably near the ground on the under or outer side of the frame G', or it can be passed directly through the bars of said frame, as shown in the drawings. It is provided with winding-spools $t$ and also with a crank $t'$ and a locking-ratchet $t^2$, if necessary. From the drums $t$ there extend ropes or cables U up to the ends of the bars or standards S S', and to the latter they are secured. The operator by means of the shaft T can exert a powerful leverage upon the carrier-frame F by winding up the ropes U. When the frame is in any position inclined outward from the vertical, the bars S S', the cable, and the shaft T are in such positions relative to the frame that the latter can be lowered by slowly releasing the cable or raised by winding it up, and the relative positions of these parts are such that when the ends $u$ of the cables are about on the line between the axis of the shaft T and the axis of the swinging section the upper end of the latter will be in such vertical position that its center of gravity will be approximately in the vertical plane of its axis. The swinging section can be caused to pass across such planes backward toward the thresher either under the influence of slight momentum or by a slight force applied by the hand to the arms or bars S. Instantly after crossing and on its beginning to swing inward over the thresher it is resisted by the cable, and the operator can control its descent by means of the winding-drum. When it is desired to again take the belt-frame away from the thresher and carry it out to its operating position, the above-described steps will be reversed—that is to say, draft is exerted upon the cables by means of the winding-drum until the free end of the belt-frame is brought up to the vertical, and after its center of gravity has passed the vertical plane of the shaft H it is allowed to descend upon the rear side slowly to any desired position.

Heretofore in threshing and straw-stacking machines of this class it has been customary to employ two sets of driving mechanisms, one for actuating the elevators or carrier-belts and the other for effecting the oscillating of the entire stacker mechanism horizontally about a vertical axis. In the present construction I have simplified the machine in this respect and have provided a single driving mechanism from which the power and motion are taken for both elevating and delivering the straw and for swinging the stacker. The devices which effect the lateral movement of the stacker and the reversing mechanism will be described below. At present it is noticed that power from some suitable part of the thresher is taken by belt to the shaft V, mounted above the rear part $a$ of the thresher-frame, and this shaft is connected to a rear cross-shaft W by the chain $v$, there being sprockets on the shafts, respectively, at $v'\ v^2$. The shaft W is in the vertical plane of the axis of horizontal oscillation of the stacker.

I believe myself to be the first to have provided an "attached" stacker—that is to say, a stacker secured directly to the rear end of the thresher-frame—which is held and supported by hinging devices extended over a prolonged vertical line—to wit, a line extending from above the uppermost parts of the thresher-frame to points at the bottom thereof—and has its belt or belts driven from the upper end. As a result I am enabled to reduce the number and the sizes of the parts which form the hinge connection and also greatly reduce the weight of this part of the mechanism. It has generally been customary to employ mutual engaging rings of relatively large diameter or tracks and series of rollers for properly centering and bracing the oscillating frame and stationary frame. All of these I have dispensed with and have reduced the hinging devices to two short strong pivots or journals, as at $g^2\ g^3$; but as these are widely remote from each other and as the intervening framework G G' G² has its parts rigidly connected throughout the result is provision of a wide base (on vertical lines) for the stacker-frame. All of the heavy parts of the frames G G' and the belts and other parts connected therewith are firmly supported on the short strong rearwardly-projecting frame $a^3$ and at a point quite near the main frame of the thresher, and therefore the upper frame at G², being relieved of the work of vertically supporting all this lower part of the stacker, can be comparatively light and yet be a strong brace or stay frame for the upper portion.

By placing the belt-driving mechanism in a position such as that herein presented I am enabled to apply the power to the belts with great advantage. The belts are practically divided into two elements, one of which is driven at the head or upper end—to wit, the belt $d$—this resulting in great economy of the power for actuating the carriers, and the power is applied to the adjustable element of the stacker from points close to its inner end and on lines which coincide with the lines of movement of the belt $f$ or nearly coincide with them during the greater part of its operation.

It has been generally common heretofore to attain the vertical adjustment of the outer end of the stacker by swinging it around the axis of the lowermost roller, the one corresponding to that at $d^4$; but in this respect the present machine radically differs from the earlier ones in having the stacker-frame rigid throughout (as the parts G G') to points relatively high. This obviates the necessity of lifting and lowering a large part of the heavy framework. Then to compensate for the loss arising from the lack of vertical adjustment of the inner part of the stacker-frame I place the upward and downward extending part E at a sharp angle and maintain it there, this frame being rigid, as above described, and to insure that although thus nearly vertical it shall rapidly and properly carry up the straw I combine with it the under acting belt $e$, which prevents the straw from falling away from the belt $d$ and assists in its upward propulsion.

It will be readily seen that in many respects there can be departure from the details of construction which are shown without departing from the essential features of the invention. The upwardly-inclined part of the belt $d$, for instance, may be separate from the lower part below the straw-hopper without essentially altering many of the other parts of the mechanism, though I prefer the present construction and arrangement of this belt, as it simplifies the driving devices and enables me to actuate the belt both of the upper or outer swinging frame-section and of the lower or inner section with economy of power. As the lower or inner section of the stacker-frame is throughout all of its parts fixed in relation to the vertical axis around which it swings horizontally, the relative positions of the power parts which convey the power to the upper end of the inner belts and the inner end of the upper belt remain fixed, and therefore uniformly efficient, whatsoever positions the belts may be in relative to the vertical axis.

A special rest or support is by preference provided for the outer carrier-frame F' when in its folded position. In Figs. 7 and 8 this rest is shown as consisting of a bar $g^6$, carried by legs or brackets $g^7$, fixed on the frame $G^2$.

So far as the features of my invention thus far described are concerned the shaft $g^3$ may be driven by mechanisms of various forms and the stacker oscillated by any suitable means. I have, however, devised a special mechanism for both of the above purposes having important features of simplicity and efficiency, which will now be described. The shaft W having always the same direction of rotation, that the carrier-belts may be properly driven, has fixed or pinned on it a bevel-wheel 1, Fig. 9. 2 is a horizontal bevel-pinion fixed on the lower end of the shaft $g^3$ and engaged and driven by the wheel 1. Motion in a constant direction is thus imparted to the elevating and carrying belts through the mechanism already described leading from the shaft $g^3$ and sprocket $P^2$. With this belt-driving mechanism I combine the oscillating devices for the stacker-frame for automatically turning the latter from side to side on the pivots $g^2$ $g^3$. Arranged in line with the shaft W is a reversible shaft 3, mounted at its outer end in a suitable bearing or bearings 4 on the frame $a^6$ and at its inner end preferably fitted in a bearing 5 within the wheel 1. 6 is a bevel-wheel loose on the shaft 3 and held in constant engagement with the pinion 2. 7 is a worm fixed on the shaft 3, which may conveniently hold the wheel 6, as above described. 8 is a double clutch engaged and rotated with the shaft 3 by means of a spline 9, on which it may slide either to engage a corresponding clutch member 10 on the wheel 1 or the clutch member 11 on the wheel 6. 12 is a shifting-lever connected with and adapted to slide the clutch 8 and controlled by a spring 13, which tends to force the lever and clutch into either of said engaging positions when the lever has passed the central point of its path. When the clutch 8 is clutched with the wheel 6, the worm 7 will, through the shaft W, wheels 2 and 6, and shaft 3, be driven in the direction of the arrow 14, Fig. 9, oppositely to that of the shaft W. When the lever 12 is shifted to its other position, the shaft 3 will be clutched with the wheel 1 and shaft W and rotated with the worm in the same direction oppositely to the arrow 14, leaving the wheel 6 free to run with the pinion 2; but it will be seen that this reversal does not affect the constant rotation of the pinion 2. The reversing worm 7 engages a worm-wheel 15, fixed on or clutched with a vertical shaft 16. The latter is mounted in a suitable bearing 18, carried by the frame $a$ $a^7$ $a^6$, and has fixed on its upper end a spur-pinion 17, which engages and drives the wheel $G^3$, sleeve $g^4$, and frame $G^2$ in a direction dependent upon the direction of rotation of the worm.

The clutch-lever 12 is shifted by pins 19, fixed in the wheel $G^3$ at suitable points, Figs. 3 and 4, or in some part actuated by said wheel and properly located with reference to said lever. Several sockets 20 may be provided for said pins to allow for an adjustment of the latter, which will vary the horizontal play of the stacker in an obvious manner.

The stability of the frame $G^2$ may be enhanced by a wide bearing-ring 21, fixed on the bars $a^6$ by brackets 22 and engaged by rollers 23, journaled in brackets 24, fixed on the bars $g^5$, Figs. 3, 7, 8.

In Figs. 7 and 8 the principal power-shaft is shown at W', driven from the right side of the machine by a belt-pulley $W^2$. The worm and worm-wheel are correspondingly changed to the left side of the machine, as shown.

To disconnect the stacker from the oscillating mechanism and allow it to be manipulated from the stack, a handle X may be employed, by which the worm-wheel can be unclutched from the shaft 16.

For convenience of description I herein refer to the belt-frame G' as being "vertical," meaning thereby that it extends upward in a direction approximating more or less closely to one perpendicular to the horizontal, but not meaning to be understood as limiting its position to an absolutely vertical one, as such position can be varied within practical limits without departing from the essential features of the construction. I also refer to the fact that the frame G' "has all of its parts fixed in relation to its vertical axis," meaning thereby that this frame G' is not, as in many earlier constructions, supported upon a horizontal hinge at the lower end, around which it can be swung and adjusted.

I herein claim means whereby the inner roller of the outer elevator-section is enabled to turn over the upper roller of the inner elevator-section; but the specific features of the hinge connection between the said elevator are not claimed herein, but are claimed in my application, Serial No. 18,098, filed May 26, 1900.

What I claim is—

1. In a straw-stacker, the combination of a main supporting-frame, an inner frame comprising top and bottom members, and an upward-extending connecting member G', said inner frame being mounted on the main frame on a vertical axis, an outer frame-section hinged at the upper part of the inner frame, adjustable vertically and foldable downward over said inner and main frames, a carrier on said member G' having an upper shaft H, a separate carrier-belt on said outer section having an inner shaft $f^7$ and foldable with the outer section relative to the other carrier, and means for actuating said carriers, the shaft $f^7$ being arranged to swing over the shaft H in the folding operation.

2. In a straw-stacker the combination of a main supporting-frame, a rigid inner frame comprising top and bottom members and an upward and downward extending connecting member G', said rigid frame being mounted on said main frame on a vertical axis, an upper and outer frame-section hinged at the upper part of said rigid frame, adjustable vertically and foldable inward over the said rigid and main frames, straw-carrying means on said connecting member and outer section, and actuating mechanism at the upper end of said vertical axis connected with said rigid frame to swing the same horizontally, substantially as set forth.

3. In a straw-stacker the combination of a main supporting-frame, a rigid inner frame comprising top and bottom members and an upward and downward extending connecting member G', said rigid frame being mounted on said main frame on a vertical axis, an upper and outer frame-section hinged at the upper part of said rigid frame, adjustable vertically and foldable inward over the said rigid and main frames, a carrier-belt on said member G', a separate carrier-belt on said outer section foldable therewith relative to the other belt, means for actuating said belts, and actuating mechanism at the upper end of said vertical axis connected with said rigid frame to swing the same horizontally, substantially as set forth.

4. The combination of a supporting-frame, an inner stacker-section comprising a rigid frame mounted on a vertical axis on said supporting-frame by pivots at the upper and lower parts of said frames, an outer stacker-section hinged to the upper part of said rigid frames, a belt-carrying roller at the upper end of said rigid frame, a separate belt-carrying roller at the inner end of said outer section, said outer section with its roller being adapted to swing inward over said rigid frame and its roller, separate inner and outer straw-carrying belts on said inner and outer rollers respectively and otherwise mounted to operate on said inner and outer stacker-sections, means for actuating said belts, and means for swinging the said rigid frame horizontally, substantially as set forth.

5. In a straw-stacking mechanism, the combination, with a main supporting-frame, of a stacker-frame having an upper or outer vertically-swinging section adapted to be inverted or carried over a horizontal axis from an outer horizontal position to an inner horizontal position, and an inner or lower section vibratable in horizontal planes around a vertical axis and having all of its parts fixed in relation to said axis, a carrier-belt upon the upper outer frame-section and a separate carrier-belt upon the inner lower frame-section arranged to travel upward to elevate the straw, said two separate belts being arranged to have the outer one swing bodily inward and over the outer end of the inner one, substantially as set forth.

6. In a straw-stacking mechanism, the combination, with a main supporting-frame, of a stacker-frame having an upper or outer vertically-swinging section adapted to be inverted or carried over a horizontal axis from an outer horizontal position to an inner horizontal position, and an inner or lower section swinging horizontally around a vertical axis and having all of its parts fixed in relation to said axis, a carrier-belt upon the outer frame-section and a separate, independent carrier-belt upon the inner lower frame-section arranged to travel upward and deliver the straw to the outer belt, power devices connected to the upper end of the last said belt for actuating it, and power devices for the outer belt connecting it with the inner belt substantially as set forth.

7. In a straw-stacking mechanism, the combination, with a main supporting-frame, of a stacker-frame having an upper or outer vertically-swinging section adapted to be inverted or carried over a horizontal axis from an outer horizontal position to an inner horizontal position, and an inner or lower section vibratable in horizontal planes around a vertical axis, and having all of its parts fixed in relation to said axis, a carrier-belt upon the upper outer frame-section, a carrier-belt upon the inner lower frame-section arranged to travel upward to elevate the straw, power devices connected to the upper end of the inner belt, and power devices connecting the inner belt with the inner end of the upper belt for actuating the same, substantially as set forth.

8. In a straw-stacking mechanism, the combination, with a main supporting-frame, of a stacker-frame having an upper or outer vertically-swinging section, and an inner or lower section vibratable in horizontal planes around a vertical axis, and having all of its parts fixed in relation to said axis, a carrier-belt upon the upper outer frame-section, a carrier-belt upon the inner lower frame-section arranged to travel upward to points adjacent to the inner end of the upper belt, a power mechanism at the aforesaid axis and power-transmitting devices extending therefrom to the inner end of the upper belt, substantially as set forth.

9. In a straw-stacking mechanism, the combination, with a main supporting-frame, of a stacker-frame having an upper or outer vertically-swinging section adapted to be inverted or turned around a horizontal axis from an outer horizontal position to an inner horizontal position, and an inner or lower section vibratable in horizontal planes around a vertical axis and having all of its parts fixed in relation to said axis, a carrier-belt upon the upper outer frame-section, a carrier-belt upon the inner lower frame-section arranged to travel upward to elevate the straw to the upper carrier-belt, a power mechanism connected to the upper end of the inner belt for actuating it, said power mechanism being maintained in fixed horizontal planes, and power-transmitting devices connected to the upper belt and adapted to vibrate in vertical planes, substantially as set forth.

10. The combination, with the separator-frame, having a straw-delivery orifice, of the two-part stacker-frame, the outer part of which is pivoted on the inner part and adapted to swing in longitudinal vertical planes relatively thereto, and the inner part of which extends from lines below the straw-orifice of the separator and near the surface of the ground to points above the separator and is adapted to swing horizontally relatively across the vertical longitudinal planes of the separator but is otherwise held rigid relatively thereto, and the power-driving gearing at the top of the separator and connected with the stacker, substantially as set forth.

11. The combination, with the thresher and separator, having a straw-orifice at the rear end, of the straw-stacker, having two belts, one connected to and supported on a vertically-swinging frame and the other supported on a frame having a horizontal part below the straw-orifice and near the ground-line, and an upwardly-inclined part, this part being rigid with the horizontal part and being pivoted to the vertically-swinging frame, and power-driving gearing at the top of the thresher and connected with the stacker, substantially as set forth.

12. The combination, with the thresher and separator, having a straw-orifice at the rear end, of the stacker permanently connected to the separator and formed in two parts, the inner part of which is connected to the separator by a vertical pivot below the straw-orifice and near the ground and extends rigidly to points above the separator, and the outer of which is hinged to the inner part, and power-driving mechanism at the top of the thresher and connected with the stacker, substantially as set forth.

13. The combination, of the separator, having a straw-orifice in the rear end, the two stacker-belts, the two frames for the stacker-belts, the inner frame having a horizontal part below the straw-orifice and near the bottom of the separator and having an upwardly-projecting part rigid with the bottom part and extending to points above the separator, and the outer frame being hinged to the inner one, and a driving mechanism at the top of the separator connected with the stacker-frame and with the said belts, substantially as set forth.

14. The combination, with the thresher and separator having a straw-orifice in the rear end of the stacker having the carrier-frame at its inner or lower end, said carrier-frame having two separated vertical pivots, one at the upper part of the separator-frame and one at the lower part below the straw-orifice and near the ground-line, and said carrier-frame having its parts rigidly connected throughout at points between the said upper and lower pivots, and power-driving mechanism at the top of the thresher above the straw-orifice and connected with the stacker, substantially as set forth.

15. The combination, of a separator, a straw-stacker mounted on said separator by widely-separated top and bottom vertical pivots, means for delivering straw from the separator to said stacker at points between said pivots, and mechanism at the top of the separator at said top pivot and connected with the stacker to vibrate it horizontally on said pivots, substantially as set forth.

16. The combination, of a separator a straw-stacker mounted on said separator by widely-separated top and bottom vertical pivots, means for delivering straw from the separator to said stacker at points between said pivots, and mechanism at the top of the separator at said top pivot and connected with the stacker to vibrate it horizontally on said pivots, said mechanism having also connections with the straw-carrying means of said stacker to actuate the same, substantially as set forth.

17. In a straw-stacker the combination of an inner horizontally-vibratable stacker-section mounted on widely-separated top and bottom pivots, an outer vertically-swinging section hinged on the inner section, a straw-carrier on said inner section, a straw-carrier on said outer section, and mechanism at said top pivot connected with the outer carrier to actuate the same, substantially as set forth.

18. The combination, with the thresher and separator, of the two frame elements secured to the rear end of the separator, one at the top thereof and one at the bottom, both rigid therewith, and the stacker having an inner or lower frame and an outer or upper frame connected together, the inner frame being formed of a horizontal lower part, pivoted to the lower frame element secured to the separator, an upper horizontal part pivoted to the upper frame element secured to the separator, and a vertical part rigid with both the bottom and the top horizontal parts, the elevating-belt supported on said frame, a driving mechanism at the top of the thresher connected with the stacker-frame situated at the vertical axis of the frame-pivots and an intermediate power-transmitting mechanism on the upper pivoted horizontal part of the frame connected with said belt, substantially as set forth.

19. The combination, with the thresher and separator, of the stacker connected to the separator by hinge devices having a vertical axis, said stacker having a vertical or inclined elevator-belt, driving devices arranged to impart power to the upper end of the elevator-belt, a supplemental separate carrier-belt adaped to swing bodily relatively to the aforesaid belt and to be inverted or turned over a horizontal axis near the upper end of the vertical belt from an outer horizontal position to an inner horizontal position, and means for positively driving the bodily-swinging belt, substantially as set forth.

20. The combination, with the thresher and separator, of the stacker secured to the separator, having a vertically-adjustable carrier-belt, a separate carrier-belt arranged to deliver straw to the adjustable belt and swinging around a vertical axis relative to the separator, but otherwise held rigidly in relation thereto, and extending to points above the separator, driving devices for the said second belt and driving devices independent of those aforesaid for the first said belt, substantially as set forth.

21. The combination, with the thresher and separator, of the stacker permanently secured to the separator, and arranged to vibrate horizontally, about a vertical axis, and having a straw-carrier belt and a frame for said belt arranged to hold the lower part of the belt under the points where the straw is delivered from the separator and extended upward on vertical or inclined lines and arranged to hold the upper part of the belt in points fixed relatively to the said axis, and power devices connected to the upper end of said belt for actuating it, substantially as set forth.

22. In a straw-stacking mechanism, the combination, with a main supporting-frame, of a stacker-frame having an upper or outer vertically-swinging section and an inner or lower section vibratable in horizontal planes around a vertical axis, and having all of its parts fixed in relation to said axis, a carrier-belt upon the upper outer frame-section, a carrier-belt upon the inner lower frame-section arranged to travel upward to points adjacent to the inner end of the upper belt, a shaft or roller on the horizontal axis engaging with the upper end of the inner belt, a shaft or roller for the upper belt adapted to swing around the last said horizontal axis, and power mechanism at the aforesaid vertical axis, and power-transmitting devices extending from the power mechanism to the upper end of the inner belt and the inner end of the upper belt, substantially as set forth.

23. In an attached stacker, the combination of a horizontally-oscillating frame carrying a suitable belt or belts and having its upper pivot above or near the top of the thresher, a belt-driving mechanism having an actuating member concentric with said upper pivot, a reversing mechanism connected with the upper inner part of said frame, and means for actuating said member and reversing mechanism, comprising two shafts in the plane of said pivot, and connected respectively with said actuating member and with the stacker-frame, substantially as set forth.

24. A belt-driving and stacker-oscillating mechanism comprising a horizontal shaft, gearing for connecting the same with a stacker belt or belts, a second shaft in line with the first shaft, a gear-wheel loose on the latter shaft, engaging a member of said gearing and turning in a direction opposite to the first shaft, means for connecting the second shaft with the stacker-frame, and a clutch for alternately connecting said shafts and connecting the second shaft with said loose wheel, substantially as set forth.

25. The combination of a pivoted stacker-frame, a belt or carrier thereon, the driving-shaft W, the wheel 1 fixed thereon, the shaft 3 in line with the first shaft and connected with the stacker-frame to oscillate the same, the wheel 6 loose on the shaft 3, the pinion 2 engaging said wheels and connected with said belt, and the clutch 8 rotating with the shaft 3 and adapted to clutch either the shaft W or the wheel 6 therewith, substantially as set forth.

26. As a means for oscillating the stacker-frame, the combination with the latter of two separate shafts in line with each other, the one having a power wheel or device and the other being connected with the stacker-frame, a gear-wheel fixed on the former shaft, a gear-wheel loose on the latter shaft, means for connecting said wheels to drive the loose wheel oppositely to the former shaft, and means for alternately clutching the latter shaft with the former shaft and with said loose wheel, substantially as set forth.

27. In a straw-stacker, the combination of a supporting-frame, an inner stacker-section, an outer stacker-section swingable in vertical planes on said inner section, a carrier-roller at the upper end of said inner section, and a carrier-roller at the inner end of said outer section arranged to swing with its said section around the first-mentioned roller, substantially as set forth.

28. In a straw-stacker, the combination of an inner stacker-section, an outer stacker-section having a connection with the inner section whereby it is adapted to swing in vertical planes relative to the inner section, a straw-conveying means on the inner section, and an independent straw-conveying means on the outer section having its inner end eccentric to said connection, whereby said inner end may swing bodily around the outer end of the conveying means on the inner section, substantially as set forth.

29. In a straw-stacker, the combination of an inner stacker-section having a straw-carrier, an outer stacker-section having a straw-carrier independent of the inner straw-carrier and having its inner end arranged below the outer end of the inner carrier, and a hinge connection between said sections arranged eccentric to the inner end of the outer carrier, substantially as set forth.

30. The combination with a supporting-frame, of an upwardly-inclined, rearwardly-extending inner stacker-section supported thereon, an endless belt-carrier arranged in the said stacker-section and passing at its upper end around a roller H, an overacting carrier-belt $e$, an outer stacker-section pivoted to the upper end of the inner section and adjustable in vertical planes, an endless straw-carrier mounted in the outer stacker-section and turning about a roller $f^5$ at the inner end of the outer section, the roller $f^5$ being adjacent to and below the roller H when the stacker is in working position and such roller being bodily movable with its section about the roller H when the outer section is adjusted, substantially as set forth.

31. In a straw-stacking mechanism, the combination with a main supporting-frame, of a stacker-frame having two horizontally-vibrating sections hinged together to permit them to be brought to a common line, and the outer of said sections to points below said line and to points above said line, and two independent carriers, one on each section, arranged to have the inner end of the outer carrier lie under the upper end of the inner carrier when the sections are in operative position, and to lie above the same when they are in folded position, substantially as set forth.

32. The combination with a separator provided with upper and lower supports for the stacker between which the straw from the separator is discharged, an inner rigid stacker-section comprising a substantially horizontal lower portion arranged below the discharge of the separator and connected with the lower support by a vertical hinge, an upper substantially horizontal part arranged above the discharge for the separator and connected with the upper support thereof by a vertical hinge, and an upwardly-inclined section in which are mounted the straw-carrying devices for the inner stacker-section, an outer section pivoted to the upper end of the inner section by a horizontal hinge, straw-carrying means mounted in the outer stacker-section and independent of the straw-carrying means in the inner section, all parts of the straw-carrying means in the outer section being adjustable therewith about the pivot uniting it with the inner section, and means for adjusting the outer section relative to the inner section in vertical planes, substantially as set forth.

33. In a straw-stacker, the combination of a main separator-frame, an inner stacker-section supported by said frame, an outer vertically-adjustable section pivoted to the outer end of the inner section, straw-carriers arranged to move the straw along the said sections, and an actuating mechanism for the said straw-carriers arranged at the top of the separator-frame and connected with the straw-carriers at points adjacent to the pivotal connection between the two stacker-sections, substantially as set forth.

34. The combination with a separator-frame, of an upwardly-inclined, rearwardly-extending inner stacker-section supported thereby, an outer stacker-section pivotally connected with the outer end of the inner section and adjustable relative thereto in vertical planes, straw-carrying means arranged in the inner straw-stacker section, other straw-carrying means in the outer stacker-section, and mechanism for actuating the straw-carriers arranged on top of the separator-frame and connected to drive both sets of straw-carrying devices, the connection being adjacent to the points where the two stacker-sections are pivotally connected, substantially as set forth.

35. In a straw-stacker comprising two sections, an upwardly-inclined, rearwardly-extending section, and an outer section, the latter being connected to the former by a horizontal pivot or hinge and being adjustable in vertical planes, means for carrying the straw along the said stacker-sections, and means for driving the straw-carrying means, the connection of the driving means with the carrier being in proximity to the pivotal or hinge connection of the two stacker-sections, substantially as set forth.

36. In a straw-stacking mechanism, the combination with a main supporting-frame, of a stacker-frame having two horizontally-swinging sections, a lower inner one and an upper outer one, hinged together to permit the upper one to swing freely to a common line with the inner one and to swing to an operative position at either side of said common line, an elevator-belt on the inner section, and an independent carrier-belt on the outer section having its inner end below the upper end of the inner belt, substantially as set forth.

37. The combination with the thresher and carrier having straw-delivering devices at the rear end, of a stacking mechanism having a horizontally-vibrating frame connected to the main frame by a vertical hinge below the straw-delivering devices, the power-gearing situated at the top of the thresher-frame, whereby the inner end of the stacker can be arranged relatively low below the straw-delivering devices, and having two belt-frame sections, a lower or inner one and an upper or outer one, hinged together, belts on the said frame-sections, and power-transmitting devices connecting the said power-gearing with the belts, substantially as set forth.

In testimony whereof I affix my signature in presence of two witnesses.

JOHN B. BARTHOLOMEW.

Witnesses:
ELVAN M. VOORHEES,
W. C. MAGE.